Patented Mar. 9, 1948

2,437,369

UNITED STATES PATENT OFFICE 2,437,369

FLEXILIZER

William Allshire Waldie, Oakwood, Ohio, assignor to New Wrinkle, Inc., Wilmington, Del., a corporation of Delaware No Drawing. Application May 18, 1945, Serial No. 594,601

12 Claims. (Cl. 106—250)

This invention deals with a composition of matter qualified to transform wrinkle varnishes or wrinkle oils into such that produce—after air-drying or baking—coatings of high flexibility. In particular, this invention deals with a composition of matter for the production of oil cloth and similar flexible materials.

Heretofore there have been used mainly two methods for the production of flexible wrinkle finishes. One of these methods consists in cooking a mixture of tung oil and semi-drying oil together with the drier in two different batches to produce two mixtures of different viscosities. The two batches, the one of a very low viscosity and the other one of a very high viscosity when mixed may be used for making a flexible coating. This process has the disadvantage that the viscosity of the two batches is relatively hard to control and skilled labor is required therefor. Another drawback of this process is that in the high viscosity batch considerable waste is obtained and the output thus greatly reduced due to skinning and gelling.

The other process commonly used heretofore consists in adding a plasticizer, such as tricresyl phosphate, to the wrinkle varnishes. The plasticizer, however, reduces the viscosity of the varnish considerably and furthermore impairs the adhesive quality of the varnish. Besides, in this process, similar to the first mentioned process, non-drying oils are not usuable.

It is an object of this invention to produce a wrinkle varnish or wrinkling oil for making flexible coatings in one single batch.

It is another object of this invention to produce wrinkle varnishes or wrinkling oil for making flexible coatings without obtaining any waste product thereby due to gelling or skinning.

It is a further object of this invention to produce a wrinkling varnish or a wrinkling oil for making flexible coatings which are free from tackiness.

It is still another object of this invention to produce a wrinkle varnish or a wrinkling oil for making flexible coatings which has good adhesive power to the basis to which it is applied.

It is still another object of this invention to produce flexilizing agents which, when added to a wrinkle composition, do not destroy its wrinkling power or prevent the wrinkle formation.

It is still another object of the invention to produce a flexilizer which, when added to a wrinkle composition, does not affect or impair the wrinkle texture.

It is also an object of this invention to utilize non-drying oils for producing wrinkle compositions that dry to a highly flexible coating.

These and other objects are accomplished by composing a flexilizing agent from wrinkling oil, non-drying oil, and wrinkle producing drier.

Oils having one or several conjugated double bonds are usable as the wrinkling oil. For example, raw tung oil and dehydrated castor oil have proved to be suitable for the process and the product of my invention. As the non-drying oil, which is primarily responsible for the enhancement of the flexibility, blown castor oil is preferred to all non-drying oils; however, other non-drying oils known in the art may be used with satisfaction. As wrinkle producing driers, cobalt acetate, lead acetate or manganese acetate as well as the oxides of cobalt lead or manganese may be used.

The proportions in which the ingredients are preferably mixed are the following:

| | | |
|---|---|---|
| Wrinkling oil | gallons | 10 to 20 |
| Non-drying oil | do | 10 to 20 |
| Wrinkle producing drier | lbs. | 0.5 to 1.5 |

One composition with which I have obtained excellent results is given in the following example:

EXAMPLE 1

| | | |
|---|---|---|
| Raw tung oil | gallons | 16 |
| Blown castor oil | do | 16 |
| Cobalt acetate | lbs. | 1 |

The flexilizing agent of Example 1 was made by mixing 4 gallons of blown castor oil with 16 gallons of raw tung oil and heating the mixture to 540° F. The temperature was then held at substantially 530 to 540° F. until a typical wood oil string was obtained or, in other words, until the mixture was just about to gel. After this, the remaining 12 gallons of blown castor oil were added to the batch under rapid stirring; by this, the mixture was cooled considerably and the gellation, which was just about to set in, was checked. The mixture thus obtained was cloudy and heterogeneous. Thereafter, the mixture was again heated to approximately 450° F. and the cobalt acetate added. Heating to about 500° F. was continued until a homogeneous mixture was obtained whereupon the mass was allowed to cool.

The mixture thus obtained is especially well qualified for modifying wrinkle varnishes and wrinkling oils in order to obtain, after drying or baking, a flexible coating. As an example of varnishes for which the flexilizer of my invention may be used, the following examples are given:

Varnish A

| | |
|---|---|
| Amberol F-7 (rosin modified phenol formaldehyde resin)lbs | 85 |
| Limed leaded rosinlbs | 15 |
| Lead acetatelbs | 4 |
| Raw tung oilgals | 12 |
| Heat bodied linseed oil of Z-2 viscositygals | 3 |
| Mineral spiritsgals | 8 |
| Light gravity naphthagals | 15 |
| Nuolate cobalt, 4%gal | ¼ |

Nuolate cobalt, 4% is a cobalt lino-resinate having a cobalt content of 4% expressed as the metal.

The limed leaded rosin was obtained by melting 100 lbs. rosin and heating to 400° F., adding 4 lbs. lead acetate and increasing the temperature to 450° F. The mixture was held at that temperature until the mixture was homogeneous. Thereafter 4.5 lbs. of lime were sifted into the mixture. The temperature increased to 525° F. and was maintained again until a homogeneous mixture wos obtained. The mass was then allowed to cool and harden.

The varnish A was made by heating the tung oil with the limed leaded rosin to 540° F. and held at that temperature until a typical "tung oil string" was obtained. Heating was then discontinued and gellation checked by adding the lead acetate, the linseed oil and the Amberol. The mixture was then heated again to 450° F. until complete dissolution of the resin, whereupon mineral spirits, naphtha and cobalt drier were added.

Another varnish which has been modified with satisfaction with the flexilizer of my invention is the following:

Varnish B

| | |
|---|---|
| Amberol F-7pounds | 100 |
| Lead acetatedo | 7 |
| Raw tung oilgallons | 18 |
| Heat bodied linseed oil of Z-4 viscositygallons | 2 |
| Mineral spiritsdo | 10 |
| Light gravity naphthado | 24 |
| Nuolate cobalt, 4%do | ⅜ |

This varnish B was made by heating the tung oil with about 50 lbs. of the Amberol to 540° F. until gellation was about to start; then gellation was checked by the addition of the lead acetate, the linseed oil and the remainder of the Amberol. Solution of the resin was completed by heating to 450° F., and then mineral spirits, naphtha and cobalt drier were added.

While practically any percentage of my flexilizer may be added to the coating compositions to be modified depending upon the degree of flexibility desired, I have found that quantities of from 10 to 35% flexilizer with regard to the coating composition are most advantageous.

The following examples show a few of the many compositions which I have obtained from varnishes admixed with my flexilizer:

Example 2

| | Gallons |
|---|---|
| Varnish A | 9 |
| Flexilizer of Example 1 | 1 |

Example 3

| | Gallons |
|---|---|
| Varnish A | 3 |
| Flexilizer of Example 1 | 1 |

Example 4

| | Gallons |
|---|---|
| Varnish B | 9 |
| Flexilizer of Example 1 | 1 |

Example 5

| | Gallons |
|---|---|
| Varnish B | 3 |
| Flexilizer of Example 1 | 1 |

All of the coatings obtained by applying the mixtures of Examples 2 to 5 and subsequent drying or baking showed a uniform wrinkle texture and a high degree of flexibility; they also were free from tackiness. The use of non-drying oils reduces the cost of the varnish considerably. No waste is obtained by gelling or skinning, since the mixture does not have to be cooked to an extremely high viscosity. All coatings had excellent adhesive power. The wrinkle texture was not impaired by the flexilizer, but was identical with that obtained from the varnish without the addition of the flexilizer.

It will be understood that other varnishes than those mentioned above by way of example may be modified by the flexilizing agent of my invention; coating compositions containing alkyd resins, phenol aldehyde resins other than Amberol F-7, or natural resin, for example, are also usable. Likewise, wrinkle coating oils or oil compositions may be successfully modified with my new flexilizer.

The varnishes containing the flexibilizing agent of my invention are equally well suitable for the application to fabric, metal, plastic, leather, wood and other base materials which require a high degree of flexibility.

It will be also understood that while there have been described herein certain embodiments of my invention, it is not intended thereby to have it limited thereto or circumscribed by the specific details of procedure, proportions, materials and conditions indicated in view of the fact that the invention is susceptible to modifications within the spirit of the disclosure and the scope of the appended claims.

I claim:

1. A method of producing a flexilizing agent for wrinkle coating compositions consisting in heating a mixture of conjugated double-bonded oil and a non-drying oil to substantially 540° F. and maintaining a temperature of 530° to 540° F. until gellation is about to start; adding a further quantity of non-drying oil whereby the gellation is checked; heating to approximately 450° F., adding a wrinkle producing drier selected from the group consisting of cobalt acetate, lead acetate, manganese acetate, cobalt oxide, lead oxide and manganese oxide, and heating to approximately 500° F. until a homogeneous mixture is obtained.

2. A method of producing a flexilizing agent for wrinkle coating compositions consisting in heating a mixture of 10 to 20 gallons of conjugated double-bonded oil and a non-drying oil to substantially 540° F. and maintaining a temperature of 530° to 540° F. until gellation is about to start; adding a further quantity of non-drying oil, said quantity being adjusted so that the total amount of non-drying oil added is about 10 to 20 gallons; heating to approximately 450° F., adding 0.5 to 1.5 lbs. of a wrinkle producing drier selected from the group consisting of cobalt acetate, lead acetate, manganese acetate, cobalt oxide, lead oxide and manganese oxide, and heating to approximately 500° F. until a homogeneous mixture is obtained.

3. A method of producing a flexilizing agent for wrinkle coating compositions consisting in heating a mixture of 16 gallons of conjugated double-bonded oil and a non-drying oil to substantially 540° F. and maintaining a temperature of 530° to 540° F. until gellation is about to start; adding a further quantity of non-drying oil, said quantity being adjusted so that the total amount of non-drying oil added is about 16 gallons; heating to approximately 450° F., adding 1 lb. of a wrinkle producing drier selected from the group consisting of cobalt acetate, lead acetate, manganese acetate, cobalt oxide, lead oxide and manganese oxide, and heating to approximately 500° F. until a homogeneous mixture is obtained.

4. A method of producing a flexilizing agent for wrinkle coating compositions consisting in heating a mixture of 10 to 20 gallons of raw tung oil and a blown castor oil to substantially 540° F. and maintaining a temperature of 530° to 540° F. until gellation is about to start; adding a further quantity of blown castor oil, said quantity being adjusted so that the total amount of blown castor oil added is about 10 to 20 gallons; heating to approximately 450° F., adding 0.5 to 1.5 lbs. of a wrinkle producing drier selected from the group consisting of cobalt acetate, lead acetate, manganese acetate, cobalt oxide, lead oxide and manganese oxide, and heating to approximately 500° F. until a homogeneous mixture is obtained.

5. A method of producing a flexilizing agent for wrinkle coating compositions consisting in heating a mixture of 16 gallons of raw tung oil and 4 gallons of blown castor oil to substantially 540° F. and maintaining a temperature of 530° to 540° F. until gellation is about to start; adding 12 more gallons of blown castor oil whereby the gellation is checked; adding 1 lb. of cobalt acetate and heating to approximately 500° F. until a homogeneous mixture is obtained.

6. A method of producing a flexilizing agent for wrinkle coating compositions consisting in heating a mixture of 10 to 20 gallons of dehydrated castor oil and a blown castor oil to substantially 540° F. and maintaining a temperature of 530° to 540° F. until gellation is about to start; adding a further quantity of blown castor oil, said quantity being adjusted so that the total amount of blown castor oil added is about 10 to 20 gallons; heating to approximately 450° F., adding 0.5 to 1.5 lbs. of a wrinkle producing drier selected from the group consisting of cobalt acetate, lead acetate, manganese acetate, cobalt oxide, lead oxide and manganese oxide, and heating to approximately 500° F. until a homogeneous mixture is obtained.

7. A flexilizing agent for wrinkle coating compositions having the properties of a product manufactured according to claim 1.

8. A flexilizing agent for wrinkle coating compositions having the properties of a product manufactured according to claim 2.

9. A flexilizing agent for wrinkle coating compositions having the properties of a product manufactured according to claim 3.

10. A flexilizing agent for wrinkle coating compositions having the properties of a product manufactured according to claim 4.

11. A flexilizing agent for wrinkle coating compositions having the properties of a product manufactured according to claim 5.

12. A flexilizing agent for wrinkle coating compositions having the properties of a product manufactured according to claim 6.

WILLIAM ALLSHIRE WALDIE.

REFERENCES CITED

The following references are of record in the file of this patent:

UNITED STATES PATENTS

| Number | Name | Date |
| --- | --- | --- |
| 1,950,417 | Root | Mar. 13, 1934 |
| 1,980,309 | Agnew | Nov. 13, 1934 |
| 2,373,177 | Drummond | Apr. 10, 1945 |

FOREIGN PATENTS

| Number | Country | Date |
| --- | --- | --- |
| 523,527 | Great Britain | July 16, 1940 |

OTHER REFERENCES

Protective and Decorative Coatings, Mattiello, vol. 1, 1941, page 134.